(No Model.) 4 Sheets—Sheet 1.
C. H. SALZMAN.
MOWING AND REAPING MACHINE.

No. 455,602. Patented July 7, 1891.

Witnesses:
W. A. Kennedy
F. Stanly Elmore

Inventor:
C. H. Salzman
By Philip T. Dodge
Attorney:

(No Model.) 4 Sheets—Sheet 2.

C. H. SALZMAN.
MOWING AND REAPING MACHINE.

No. 455,602. Patented July 7, 1891.

Witnesses:
W. A. Kennedy
F. Stanly Elmon

Inventor:
C. H. Salzman
By Phil T. Dodge
Attorney.

(No Model.) 4 Sheets—Sheet 3.
C. H. SALZMAN.
MOWING AND REAPING MACHINE.

No. 455,602. Patented July 7, 1891.

Witnesses:
N. R. Kennedy
F. Pauly Elmore

Inventor:
C. H. Salzman
By Phil T. Dodge
Attorney.

THE NORRIS PETERS CO., PHOTO-LITHO., WASHINGTON, D. C.

(No Model.) 4 Sheets—Sheet 4.
C. H. SALZMAN.
MOWING AND REAPING MACHINE.
No. 455,602. Patented July 7, 1891.
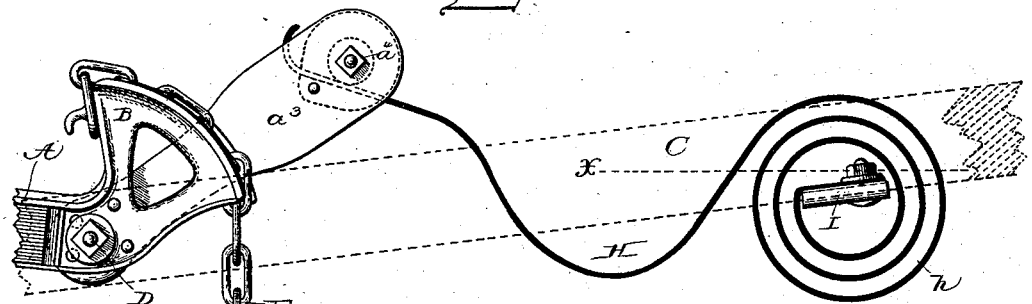
Fig. 4.
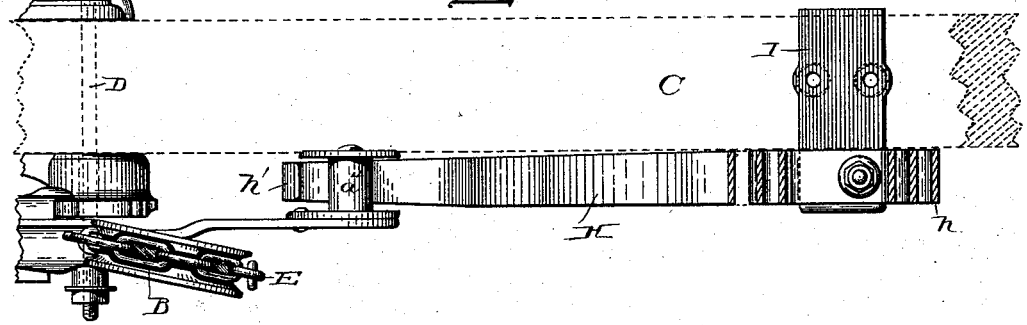
Fig. 5.
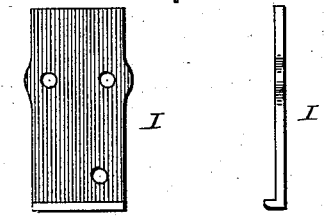 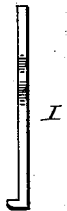
Fig. 6. Fig. 7.
Witnesses:
N. R. Kennedy
F. Stanly Elmore
Inventor:
C. H. Salzman
By Phil. T. Dodge
Attorney.

UNITED STATES PATENT OFFICE.

CHRISTIAN H. SALZMAN, OF CHICAGO, ILLINOIS, ASSIGNOR TO THE D. M. OSBORNE & COMPANY, OF AUBURN, NEW YORK.

MOWING AND REAPING MACHINE.

SPECIFICATION forming part of Letters Patent No. 455,602, dated July 7, 1891.

Application filed October 28, 1889. Serial No. 328,398. (No model.)

*To all whom it may concern:*

Be it known that I, CHRISTIAN H. SALZMAN, of Chicago, in the county of Cook and State of Illinois, have invented certain Improvements in Mowing and Reaping Machines, of which the following is a specification.

This invention relates to improvements in that class of mowing and reaping machines in which the cutter-bar is raised and lowered by means of a hand-lever operated by the driver in his seat.

The object of the improvement is to provide means for assisting the driver in operating the lever; and to this end it consists in a spring arranged in the form and manner hereinafter described.

Figure 1:
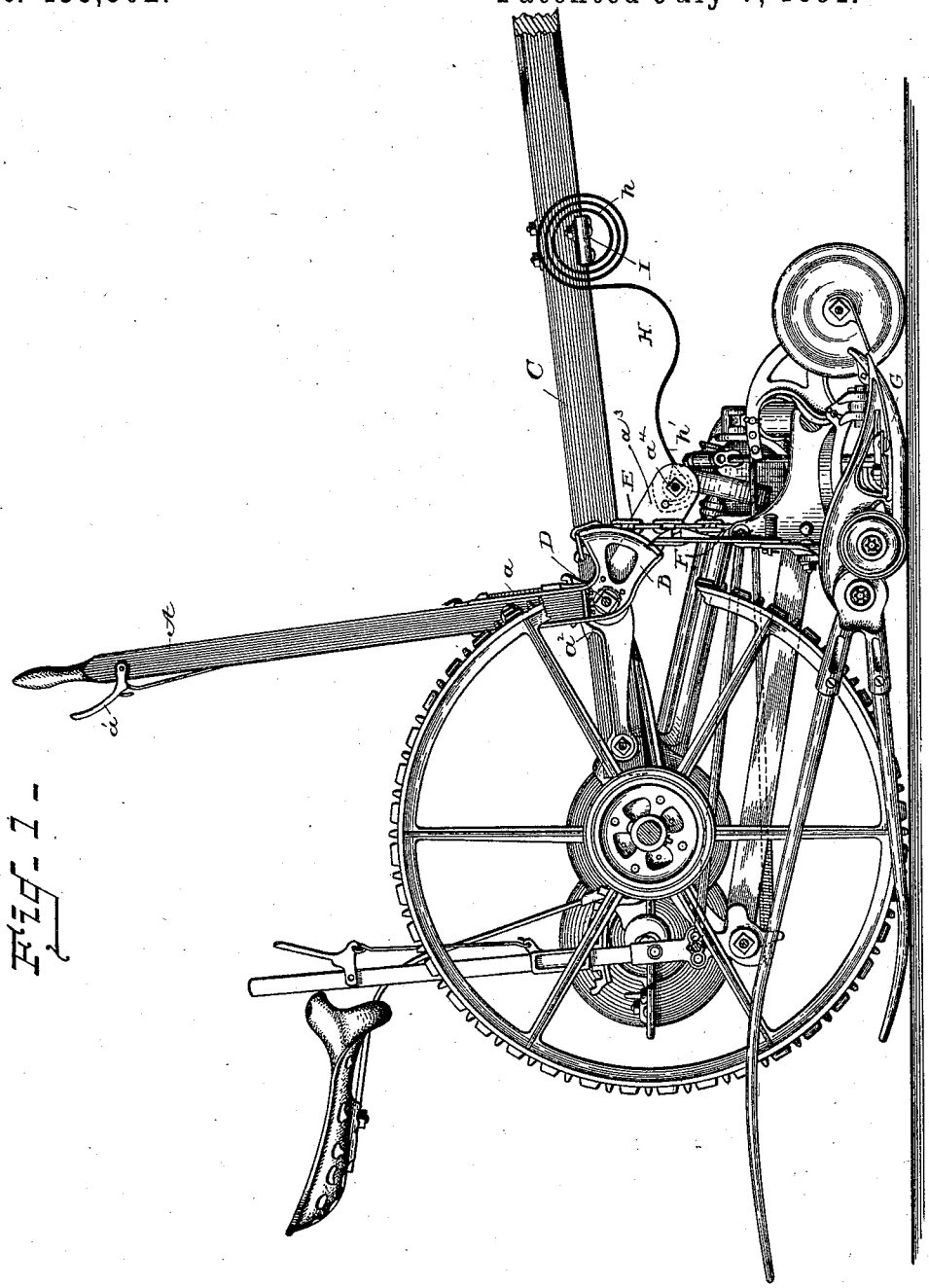
Figure 2:
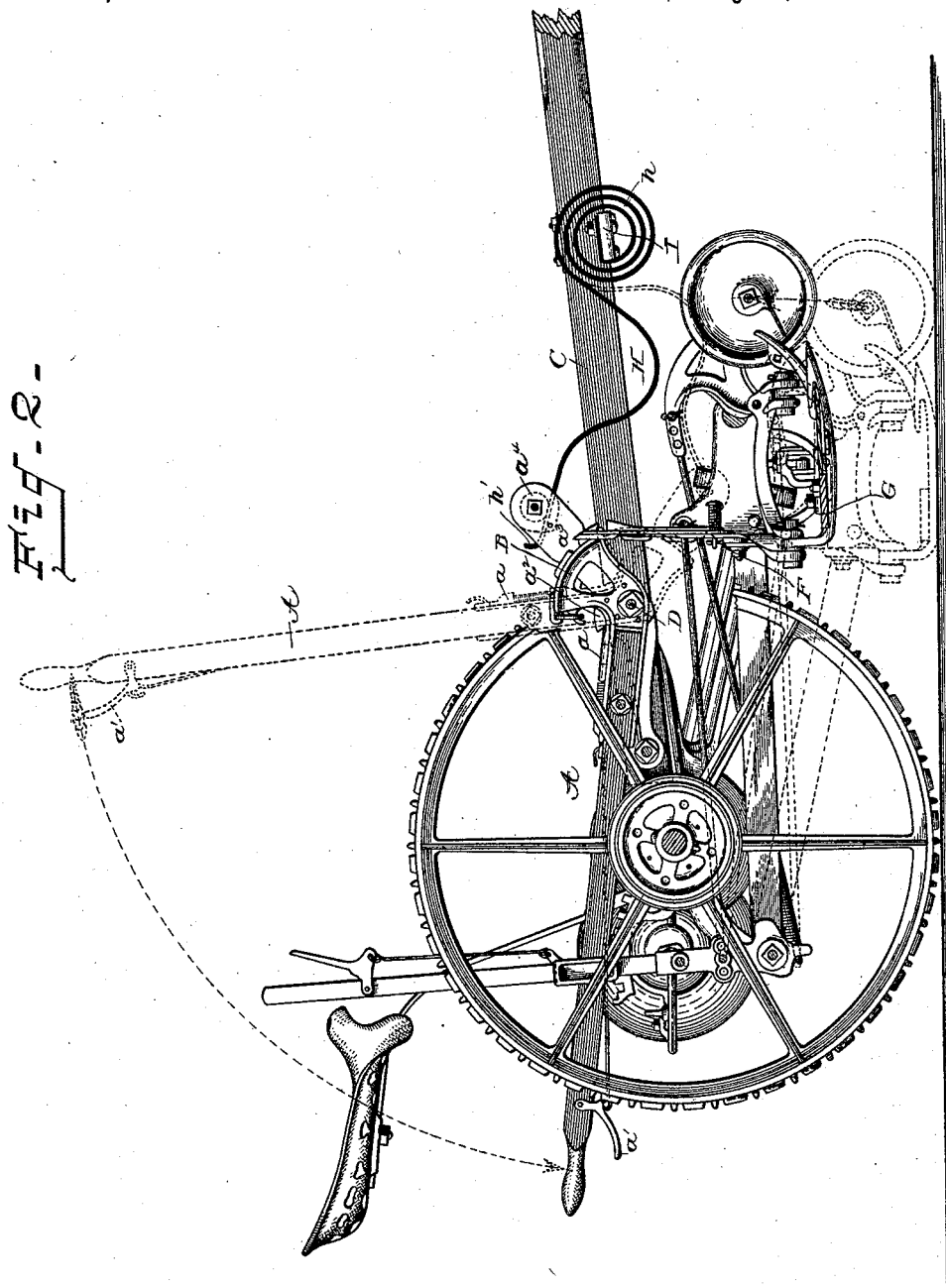
Figure 3:
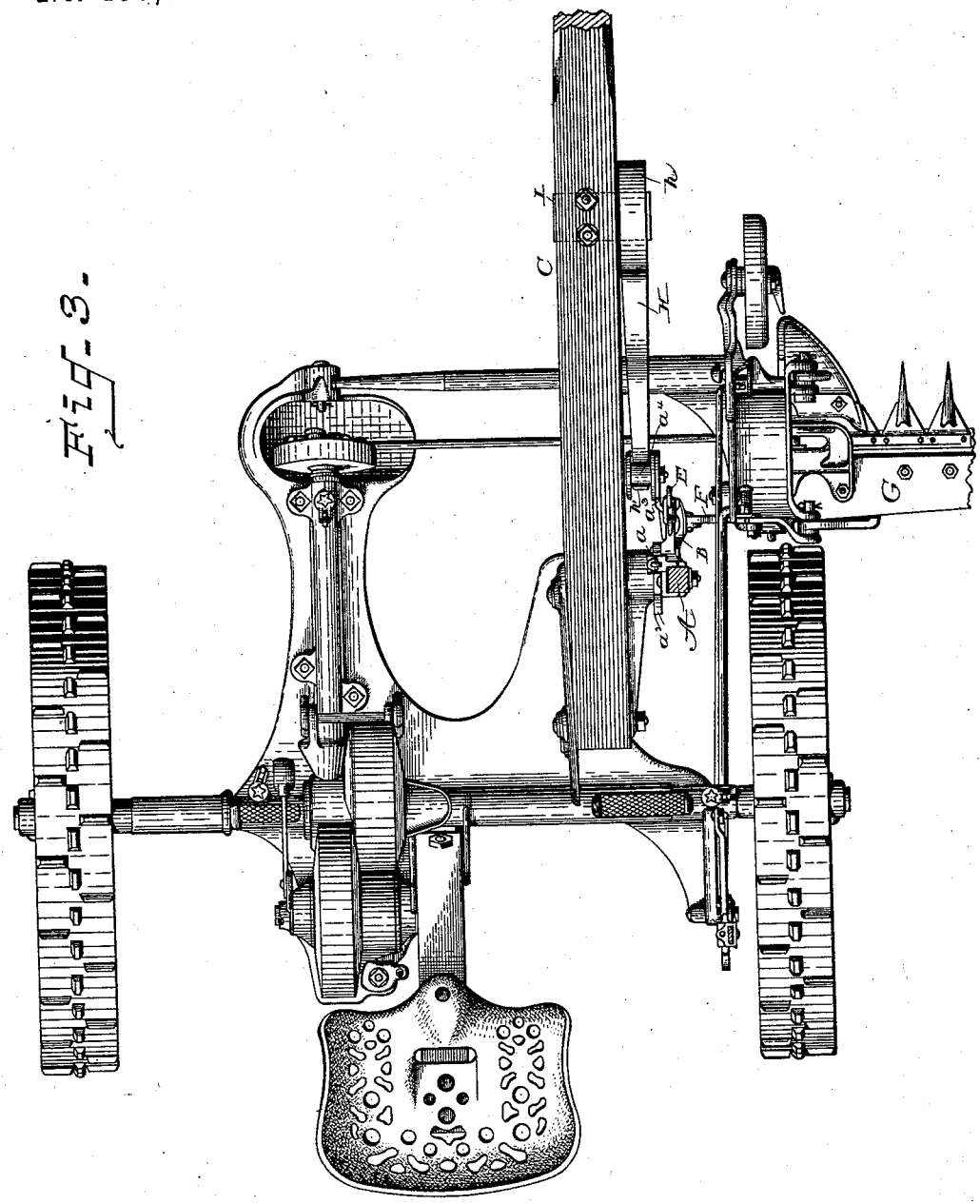

In the accompanying drawings, Figure 1 is an elevation of a mowing-machine from the grass side thereof with my improvement applied, the parts being in operative position. Fig. 2 is a similar view showing in full lines the cutting mechanism lifted out of action and in dotted lines the operative position of the parts. Fig. 3 is a top plan view of the machine, the forward end of the draft-pole and the outer end of the cutter-bar being broken away. Fig. 4 is a side elevation, on an enlarged scale, of the spring and the lower end of the lifting-lever with which it connects. Fig. 5 is a top plan view of the same parts. Figs. 6 and 7 are respectively a plan view and an edge view of the plate by which the spring is sustained.

The machine shown is of the ordinary two-wheeled type, having the main frame mounted on an axle between the wheels and connected with the cutting mechanism by an intermediate coupling-frame.

A is a hand-lever, commonly known as the "lifting-lever," provided at its lower end with the quadrant B and pivoted to the draft-pole C at D. To the quadrant of the lever is hooked the chain E, the lower end of which is connected with the piece F, which carries the inner or main shoe of the cutter-bar G, so that by moving the lever backward and forward the cutter-bar is raised and lowered. The lever is provided with a locking-dog $a$, controlled by a thumb-latch $a'$ and engaging a toothed plate $a^2$.

The foregoing parts are all of ordinary construction, and, being familiar to those skilled in the art, need no further description.

In applying my improvement I provide the hand-lever at its lower end with a forwardly-extending arm $a^3$, formed thereon or bolted rigidly thereto and provided near its extremity with a laterally-projecting stud or roller $a^4$. I next provide a strong spring-arm H, having one end coiled, as shown at $h$, and the opposite end bent upward, as at $h'$. At a suitable distance forward of the hand-lever I bolt the coiled end of this spring firmly to a plate I, which is in turn bolted firmly to the draft-pole. The opposite or free end of the spring is extended rearward and seated beneath the stud or roller $a^4$ on the lever-arm, the parts being adjusted so that the spring exerts a strong upward pressure on the arm, tending thereby to move the hand-lever backward and assist in lifting the cutting mechanism. The parts are so formed and arranged and the tension of the spring so adjusted that it gives the driver material assistance in lifting the cutter, the driver being thus enabled to raise and lower the cutting mechanism with less exertion than would otherwise be the case. As the cutter descends to an operative position, the angle between the lever-extension $a^3$ and the spring increases until finally they stand at approximately right angles to each other. Owing to this fact and to the fact that the roller of the lever travels over the spring toward and from its fixed end, the lifting effect of the spring is modified or limited, so that there is no danger of the cutter being lifted accidentally from its operative position. In other words, the arrangement admits of the spring being made of such strength that it will give the operator material assistance in lifting the cutter out of action.

In the mower shown the draft-pole is in effect a part of the main frame, and is so treated herein.

It is obvious that the form of the spring and the arm on the hand-lever may be modified and that the spring may be fastened to the frame by a clip or support of any appropriate character.

The upturned end $h'$ of the spring engaging behind the stud or roller of the lever-extension $a^3$ prevents the hand-lever from falling forward, as shown in Fig. 1. It will also serve as a check to prevent the lever from tipping rearward, so that the roller will disengage from the spring.

I am aware that springs have been variously applied in mowing-machines in connection with the lifting-levers and with the cutting devices to assist in raising the latter; but I believe myself to be the first to combine with a spring-arm fixed at one end to the frame a lifting-lever having an arm arranged to travel over the free end of the spring.

Having thus described my invention, what I claim is—

1. In a mowing-machine, the main frame, the cutting mechanism, and the lifting-lever having an arm or extension $a^3$, in combination with the spring-arm having one end fixed to the frame at a distance from the lever and the other end arranged in position for the lever-arm to bear and travel thereon.

2. In a mower, the main frame, the cutting mechanism jointed thereto to rise and fall, and the cutter-lifting lever mounted on the main frame and provided with an arm $a^3$, having stud or roller $a^4$, in combination with the spring-arm having one end arranged in position for the stud to travel thereover and the other end coiled and fixed rigidly to the main frame.

3. In a mower, and in combination with the main frame, the cutter-lifting lever mounted thereon and having the arm or extension $a^3$ and stud $a^4$, and the spring-arm having one end fixed to the frame remote from the lever and the other end arranged to ride against the stud $a^4$ and formed with the bend $h'$ to limit the motion of the lever.

In testimony whereof I hereunto set my hand, this 4th day of October, 1889, in the presence of two attesting witnesses.

CHRISTIAN H. SALZMAN.

Witnesses:
G. W. ALLEN,
B. TIMMERMAN.